Nov. 8, 1927.                 1,648,055
H. MESINGER
SADDLE
Filed Jan. 2, 1926
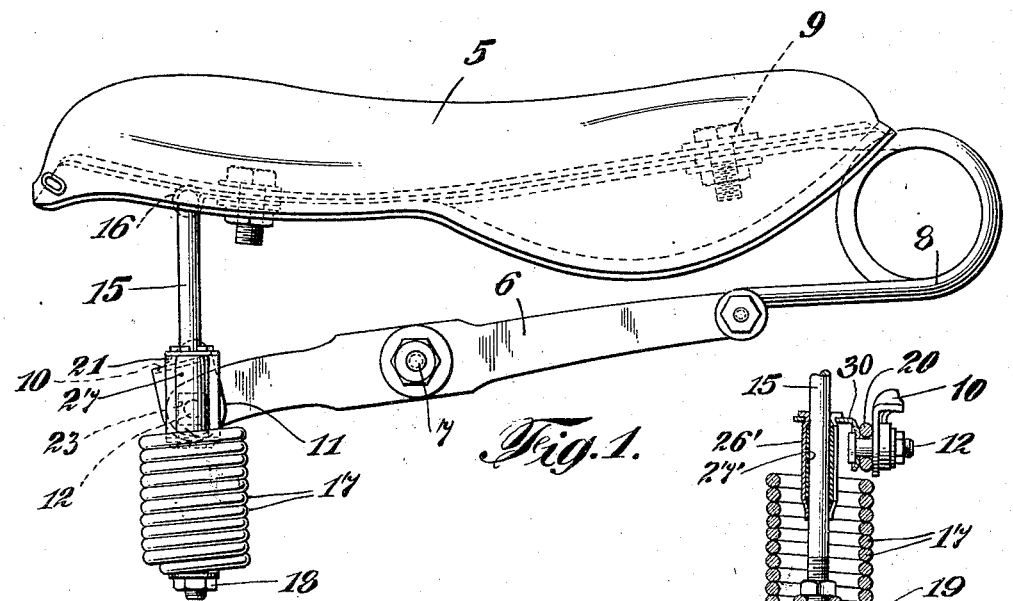
Fig. 1.
Fig. 4.
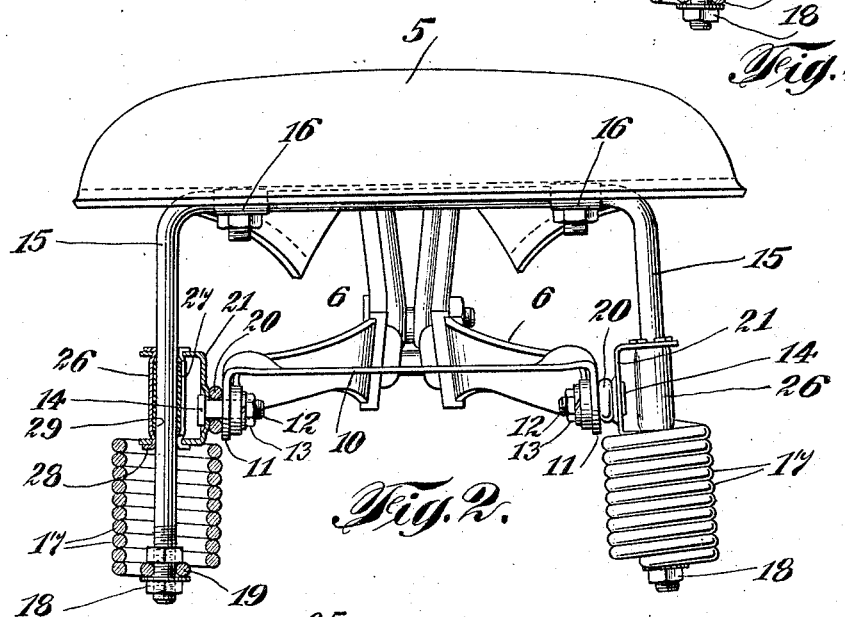
Fig. 2.
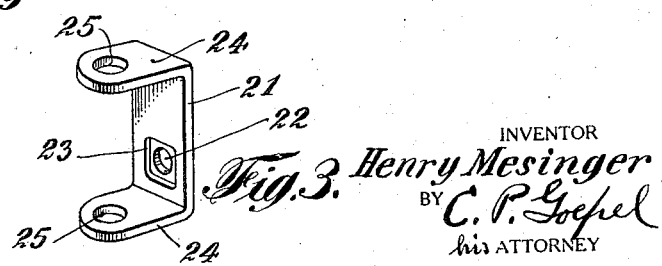
Fig. 3.
INVENTOR
Henry Mesinger
BY C. P. Goepel
his ATTORNEY Patented Nov. 8, 1927.

1,648,055

UNITED STATES PATENT OFFICE.

HENRY MESINGER, OF NEW YORK, N. Y.

SADDLE.

Application filed January 2, 1926. Serial No. 78,732.

This invention relates to saddles, and more particularly to a saddle for motorcycles, bicycles and similar vehicles, and has for its primary object to simplify and improve the construction of the cushioning means for such vehicle saddles whereby the most severe shocks or jars will be efficiently counteracted or absorbed without liability of distorting or breaking the cushioning springs.

It is one of the principal objects of my present improvements to provide a cushioning system for motorcycle or bicycle saddles including two expansion springs and a vertical rod extending through each spring connected to the lower end thereof and to the rear end of the saddle, and means for guiding the movement of said rods to insure a direct vertical thrust upon the expansion spring in the line of its axis and prevent any side sway or lateral distorting strain upon the spring coils which might tend to break, bend or distort the same.

It is a further general object of the invention to provide a device for accomplishing the above noted result which is of exceedingly simple and economical construction, practically noiseless in its operation and readily applicable to various standard types of motorcycle and bicycle saddles.

With the above and other objects in view, the invention consists in the improved saddle, and more particularly in the cushioning means therefor and the form, construction and relative arrangement of its several parts as will hereinafter be more fully described, illustrated in the accompanying drawing and subsequently incorporated in the subjoined claims.

In the drawing, wherein I have disclosed several simple and practical embodiments of the invention,—

Figure 1 is a side elevation of a saddle equipped with my improved cushioning means;

Fig. 2 is a rear end elevation partly in section;

Fig. 3 is a detail perspective view of the guide sleeve bracket, and

Fig. 4 is a detail section illustrating a slightly modified form of the bracket and mounting of the guide sleeve.

Referring in detail to the drawing, the saddle top 5 therein shown for illustrative purposes may be of any conventional form and construction, said saddle top being supported by a frame consisting of spaced longitudinally extending bars 6 which are connected to each other intermediate of their ends by suitable means 7 whereby the said supporting bars may be secured or clamped in connection with the upper end of the seat supporting post (not shown). The forward ends of the bars 6 have secured between them one end of a front spring 8, the other end of which extends beneath the forward end of the base or cantle plate of the saddle top 5 and is rigidly fixed thereto as by means of the bolt 9.

Rearwardly of the securing device 7 for the bars 6, said bars are divergently disposed and have their rear ends widely spaced apart as shown in Fig. 2 of the drawings, and connected by a transverse yoke or bridge member 10. Preferably, though not necessarily, these rear ends of the bars 6 are disposed against the inner sides of the angularly bent extremities 11 of the bridge bar, the said parts having coinciding openings to receive the connecting bolts 12 upon the inner ends of which the clamping nuts 13 are threaded. The other ends of these bolts are preferably provided with square or rectangular heads 14 for a purpose which will be presently explained.

To the rear end of the saddle top 5, spaced vertically disposed rods 15 are pivotally connected at their upper ends. As herein shown, these rods are integral parts of a substantially U-shaped member, the intermediate part of which extends transversely across the lower face of the saddle cantle plate and is secured in connection therewith for pivotal or turning movement by the spaced clips 16 fixed to said cantle plate.

The lower ends of the rods 15 are tightly secured or connected to the lower end coils of the expansion springs 17, as by means of suitable nuts 18 threaded upon said rods above and below terminal eyes 19 formed on the lower end coils of the springs. At the inner side of each spring, the end of the uppermost coil thereof is vertically extended and formed into a similar eye 20 to receive one of the bolts 12. This upper end of the spring is positioned between the end of the bridge member 10 and the intermediate vertically disposed portion of a substantially U-shaped bracket 21 having an opening 22 therein which also receives the bolt 12, the inner face of said bracket being formed with a rectangular recess or countersink 23 surrounding the opening 22 to receive the square or rectangular head of the bolt 12. In this manner relative turning or rotational movement of the bracket and said connecting bolt is prevented. Thus the bracket will be securely held or fixed in its vertically disposed position.

The parallel vertically spaced end portions 24 of the bracket 21 are each provided with an opening 25. These openings receive the reduced or tapered end portions of a rigid metal sleeve 26. This sleeve is split longitudinally as indicated at 27 and the end portions of the sleeve which project above and below the bracket arms are also split and flanged outwardly upon the bracket arms as at 28 whereby the sleeve is securely locked in the bracket against shifting movement with respect thereto. Preferably, I arrange within this split metal sleeve an elongated bushing of leather or other similar material shown at 29. This bushing surrounds the rod 15 and prevents contact of the same with the wall of the metal sleeve, thus eliminating frictional wear between the metallic parts and avoiding noise incident to contact therebetween in the movement of the rod through said sleeve.

In Fig. 4 of the drawings, I have illustrated another mounting for the guide sleeve for the rod 15 and a somewhat simpler form of the supporting bracket therefor. In this case, the bracket 30 consists merely of an L-shaped metal bar one end of which is provided with an opening to receive the bolt 12 and the other horizontally disposed portion of which has an opening therein to receive the upper end of the sleeve 26' which may be of the same construction as the sleeve above described and also contains the leather bushing 27'. In this case, however, the greater part of this sleeve will extend downwardly into the expansion spring 17 and therefore, the sleeve will be largely concealed by said spring.

From the foregoing description considered in connection with the accompanying drawings, the construction and several advantages of my new saddle will be clearly understood. It will be apparent that the elongated vertical guide sleeve for the rod 15 effectively prevents any angular displacement of said rod relative to the axis of the expansion spring 17 so that the vertical thrust transmitted to said spring by the rod 15 is always in the direct line of the spring axis. Thus the spring may be safely expanded to its limit without placing thereon an additional lateral distorting or bending strain such as would be incident to an angular displacement of the rod 15. Therefore, the spring will always function at its highest efficiency and repairs incident to the breakage of the spring will be practically unknown. Such slight arcuate movement of the rear end of the saddle top as occurs in the vertical movement thereof is permitted by the loose mounting of the rods in the clips 16, thus obviating any bending strains upon the bracket 21 or the sleeve 26. Of course, it will be understood that any other means than that above described may be used for fixedly mounting the brackets 21 and the sleeves 26 on the vehicle frame and it is not necessary to provide these brackets with the openings 22 and recesses 23 of the specific form shown in the drawing. For instance, if desired the connecting bolts 12 might merely be provided with square shank sections to be received in openings of similar shape in the brackets.

From the foregoing description, it will be seen that I have provided a very simple construction and arrangement of the several parts whereby the expansion springs will effectively absorb or cushion all shocks and jars and yet be subjected to a minimum strain. It will be seen that my invention consists essentially in the provision of the fixed elongated guides for the vertically moving rods which are connected to the lower ends of the expansion springs and whereby the angular displacement of said rods relative to the axial line of the springs will be prevented. I have herein disclosed what I believe to be an entirely practical and satisfactory embodiment of my improvements for accomplishing this result. Nevertheless, it is possible that substantially similar results might also be attained by means of other alternative structures. Accordingly, it is to be understood that the privilege is reserved of resorting to all such legitimate changes in the form, construction and relative arrangement of the various elements as may be fairly incorporated within the spirit and scope of the invention as claimed.

I claim:

1. A saddle including a saddle top, side frame members yieldingly connected at their forward ends with the saddle top and supporting the latter for vertical movement, a U-shaped bracket fixed to the rear end of each of said frame members and having vertically spaced arms, spaced rods depending from the rear end of the saddle top, means supported between the bracket arms and closely engaging the respective rods to slidably guide said rods in the movement of the saddle top and prevent their angular displacement relative to the frame members, and an expansion spring concentrically associated with each of said rods having its upper end connected with one of the frame members and its lower end rigidly attached to the rod.

2. A saddle including a saddle top, side frame members connected at their forward ends with the saddle top and supporting the latter for vertical movement, a bracket member having vertically spaced arms secured to the rear end of each of said frame members, spaced rods pivotally connected with the rear end of the saddle top, guide sleeves permanently mounted between the arms of the respective bracket members and through which the respective rods are slidably engaged, said sleeve frictionally coacting with the rods and preventing angular displacement of said rods relative to the frame members in the vertical movement of the saddle top and an expansion spring concentrically associated with each rod connected at its upper end with one of the frame members and rigidly attached at its lower end to said rod.

3. A saddle including a saddle top, a supporting frame therefor connected at its forward end to the saddle top, spaced rods depending from the rear end of the saddle top, expansion springs connected at their upper ends to the frame and rigidly attached at their lower ends to the respective rods, said rods extending axially through the springs, a rigidly fixed elongated guide sleeve for each of said rods at the upper end of the expansion spring cooperating therewith to prevent angular displacement of the rod relative to the spring axis, and a bushing of anti-friction material in each of said sleeves directly engaged by the rod.

4. A saddle including a saddle top, a supporting frame therefor connected at its forward end to the saddle top, spaced rods depending from the rear end of the saddle top, an expansion spring surrounding each rod and fixed at its upper end to the frame, the lower end of the spring being rigidly attached to the rod, bracket members rigidly connected with the frame each consisting of a substantially U-shaped plate having vertically spaced end portions, an elongated guide sleeve for each of said rods fixed at its ends in the bracket arms, and a bushing of anti-friction material contained within said sleeve to directly engage the rod and prevent contact between said rod and sleeve and whereby the rod is maintained in coinciding relation with the axis of the expansion spring and its angular displacement with respect thereto prevented.

In testimony that I claim the foregoing as my invention, I have signed my name hereto.

HENRY MESINGER.